US010791524B2

(12) United States Patent
Desai et al.

(10) Patent No.: US 10,791,524 B2
(45) Date of Patent: Sep. 29, 2020

(54) CORRELATING MOBILE CLIENT DENSITY AND POWER VARIATION FOR ADAPTIVE PATH LOSS CORRECTION

(71) Applicant: Cisco Technology, Inc., San Jose, CA (US)

(72) Inventors: Vishal Satyendra Desai, San Jose, CA (US); Pooya Monajemi, Irvine, CA (US); Santosh Babaji Kulkarni, San Jose, CA (US); Young Il Choi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/255,955

(22) Filed: Jan. 24, 2019

(65) Prior Publication Data

US 2020/0245260 A1    Jul. 30, 2020

(51) Int. Cl.
*H04W 52/24* (2009.01)
*H04W 36/00* (2009.01)
*H04W 52/34* (2009.01)
*H04W 16/22* (2009.01)

(52) U.S. Cl.
CPC ..... *H04W 52/242* (2013.01); *H04W 36/0061* (2013.01); *H04W 52/245* (2013.01); *H04W 52/343* (2013.01); *H04W 16/225* (2013.01)

(58) Field of Classification Search
CPC ................................................ H04W 52/242
See application file for complete search history.

(56) References Cited

U.S. PATENT DOCUMENTS

| 6,690,652 | B1 | 2/2004 | Sadri | |
| 8,599,744 | B2 | 12/2013 | Lee et al. | |
| 9,591,588 | B1* | 3/2017 | Lee | H04W 52/242 |
| 9,769,837 | B2* | 9/2017 | Hahn | H04W 72/04 |
| 2005/0063356 | A1 | 3/2005 | Larsen et al. | |
| 2006/0274676 | A1* | 12/2006 | Niu | G01S 5/0289 370/255 |
| 2007/0242621 | A1 | 10/2007 | Nandagopalan et al. | |

(Continued)

OTHER PUBLICATIONS

Cisco, "Chapter: Transmit Power Control (TPC) Algorithm", Radio Resource Management White Paper, Jun. 24, 2016, https://www.cisco.com/c/en/us/td/docs/wireless/controller/technotes/8-3/b_RRM_White_Paper/b_RRM_White_Paper_chapter_0101.html, 10 pages.

*Primary Examiner* — Edan Orgad
*Assistant Examiner* — Won Tae C Kim
(74) *Attorney, Agent, or Firm* — Edell, Shapiro & Finnan, LLC

(57) ABSTRACT

Presented herein are techniques for using mobile client density to compensate for variations in path loss between neighboring access points. In one example, a device (e.g., wireless controller) determines one or more mobile client density variation trends in a wireless network location and determines one or more neighbor message power variation trends between at least first and second access points within the wireless network location. The device generates one or more correlation bias factors using the mobile client density variation trends and the neighbor message power variation trends. The device determines a path loss between at least the first and second access points based on the correlation bias factor and data associated with neighbor messages sent between the first and second access points.

20 Claims, 13 Drawing Sheets

(56) References Cited

U.S. PATENT DOCUMENTS

| | | |
|---|---|---|
| 2009/0042593 A1 | 2/2009 | Yavuz et al. |
| 2011/0171992 A1 | 7/2011 | Seo et al. |
| 2011/0199916 A1* | 8/2011 | Garrett ................ H04W 64/003 370/252 |
| 2013/0142096 A1 | 6/2013 | Cui |
| 2013/0196606 A1 | 8/2013 | Brown |
| 2015/0078161 A1 | 3/2015 | Elsherif et al. |
| 2015/0146543 A1 | 5/2015 | Diener et al. |

* cited by examiner

CORRELATING MOBILE CLIENT DENSITY AND POWER VARIATION FOR ADAPTIVE PATH LOSS CORRECTION

TECHNICAL FIELD

The present disclosure relates to adaptive path loss correction in wireless networks.

BACKGROUND

Wireless (e.g., Wi-Fi™) networks are local area communication networks that enable electronic devices to wirelessly exchange data or to wirelessly connect to network resources, such as the Internet. Wireless networks are becoming increasingly popular and are installed in a large number of homes, offices, public locations, etc. In a typical deployment, the wireless network is created/provided by multiple access points. In general, access points are devices that include a radio transmitter/receiver (radio) that is used to bridge the wireless and wired (e.g., Ethernet) network communication media.

In certain circumstances, wireless connectivity may be available to a large number of wireless electronic devices having wireless capabilities, referred to herein as "wireless client devices" or "wireless clients," within a certain area. Such environments may include, for example, stadiums, movie theaters, malls, convention centers, offices, or other locations. In such arrangements, the wireless network may include numerous access points deployed in a relatively small area (in comparison to traditional home or enterprise wireless deployments) in order to support a high density of clients.

DESCRIPTION OF EXAMPLE EMBODIMENTS

Overview

Figure 1A:
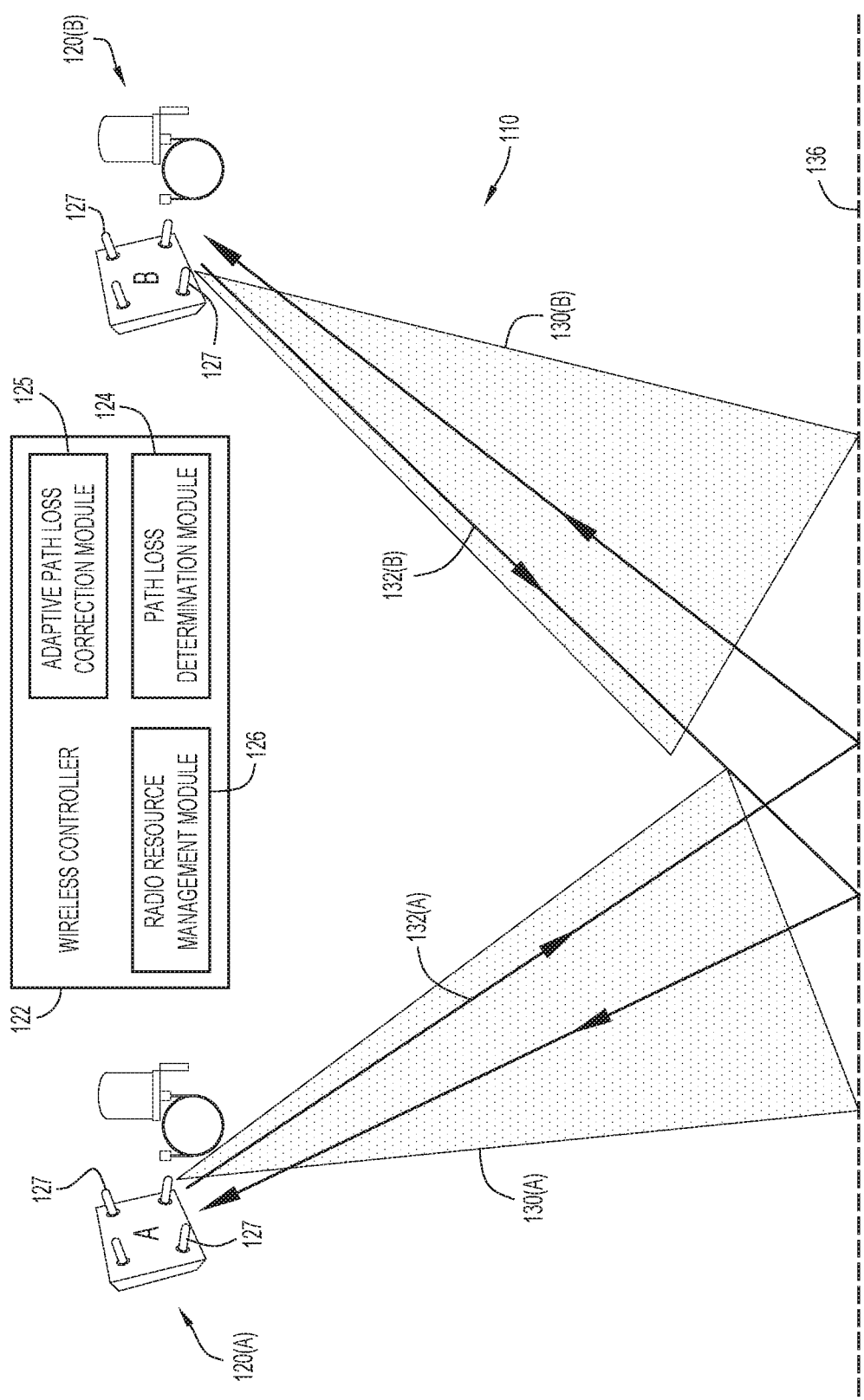
FIGS. 1A and 1B are schematic diagrams illustration a portion of a wireless network configured to implement adaptive path loss correction techniques, in accordance with certain embodiments presented herein.

Presented herein are techniques for using mobile client density to compensate for variations in path loss between neighboring access points. In one example, a device (e.g., wireless controller) determines one or more mobile client density variation trends in a wireless network location and determines one or more neighbor message power variation trends between at least first and second access points within the wireless network location. The device generates one or more correlation bias factors using the mobile client density variation trends and the neighbor message power variation trends. The device determines a path loss between at least the first and second access points based on the correlation bias factor and data associated with neighbor messages sent between the first and second access points.

EXAMPLE EMBODIMENTS

Wireless networks are created/provided by multiple access points (APs) that each include a radio transmitter/receiver (radio) that is used to bridge the wireless and wired (e.g., Ethernet) network communication media. Radio Resource Management (RRM) is used in wireless networks to control certain operations of the access points, such as dynamic channel assignment (DCA), transmit power control (TPC), Flexible Radio Assignment (FRA), Coverage Hole Detection and Mitigation (CDM), etc.

In traditional arrangements, Radio Resource Management relies on over-the-air messages exchanged between access points to determine the path loss between (e.g., relative Radio Frequency (RF) proximity of) neighboring access points. The messages exchanged between access points are sometimes referred to herein as "neighbor messages" or "access point-to-access point (AP-to-AP) messages." In certain arrangements, the neighbor messages may be Neighbor Discovery Protocol (NDP) packets, although other types of messages (e.g., 802.11 beacons, off-channel or Over-the-Air (OTA) messages, etc.) may be used in different deployments.

In general, the Radio Resource Management operations, and thus the access point operations (e.g., DCA, TPC, etc.), rely on these neighbor messages. More particularly, inter-AP radio frequency (RF) measurements (e.g., inter-AP Received Signal Strength Indication (RSSI) values) are obtained from the neighbor messages and then used to determine the path loss (RF proximity) between access points. That is, neighboring access point information, such as AP-to-AP RSSI values, etc., are used to determine path loss between access points in wireless networks. For example, in certain deployments, access point radio cell size may be optimized as part of a TPC process that utilizes inter-AP NDP packets to ensure that nearby access points have adequate cell overlap with one another, while minimizing co-channel contention. The optimal cell size is computed by leveraging RSSI from the nearby access points to compute their relative path loss or RF distance and the cell size can accordingly expand or shrink to cater to the needs of wireless client devices while minimizing coverage holes.

With modernization and improvements in new enterprise buildings, office spaces, warehouses, stadiums, etc., more and more wireless networks are being deployed in sites/environments in which traditional omni-directional antennas do not meet the coverage requirements. As such, these deployments are increasingly using directional antennas and/or include omni-directional neighboring access points that do not have clear line-of-sight (LOS) with one another. Deployments in which neighboring access points do not have clear LOS and/or include directional antennas are particularly susceptible to variations in path loss (PL).

Additionally, a majority of the Radio Resource Management operations and RF calibrations are initially optimized within a deployment while the particular environment/site is empty (i.e., minimal wireless client devices and users are present). However, in practice, a given wireless network site may, at different times, have different numbers of persons physically present within the wireless network site. The bodies of these persons present in a wireless network site will absorb some portion of the neighbor messages sent between neighboring access points, thereby causing variations in path loss (e.g., absorption of the RF signals may result in weaker received signals, thereby resulting in a determination that neighboring access points are farther apart then they actually are). This results in a mis-calculation of the path loss (RF proximity) between neighboring access points. Since, as noted, path loss is used an input to the Radio Resource Management operations, the lack of accurate path loss determinations also affects the operation of the wireless network (e.g., improper channel assignment, incorrect transmit power control, etc.). These factors also pose intricate challenges to determine optimal transmit cell size in deployments in which neighboring access points do not have clear LOS and/or include directional antennas Accordingly, presented herein are techniques for using mobile client density to compensate for variations in path loss between neighboring access points. In particular, a device (e.g., wireless controller) determines one or more mobile client density variation trends in a wireless network location. The one or more mobile client density variation trends are used as measure of the density of the moving bodies (persons) within the wireless network location during a time period. The device also determines one or more neighbor message power variation trends between at least first and second access points within the wireless network location. The one or more neighbor message power variation trends represent the variations in the power of neighbor messages sent to and/or from one or more of the first or second access points during the time period.

In the examples presented herein, the device generates one or more correlation bias factors (correlation coefficients) from the one or more mobile client density variation trends and the one or more neighbor message power variation trends. The one or more correlation bias factors indicate how the mobile client density, and more particularly the physical presence of persons (bodies), within the wireless network location affect the power of neighbor messages sent between the first and second access points. The one or more correlation bias factors are used as offset/weighting/adjustments factors in the determination of a path loss between at least the first and second access points. That is, a path loss between at least the first and second access points is determined based on neighbor messages sent between the first and second access points, and the one or more correlation bias factors which correct for the physical presence of persons (bodies), within the wireless network location.

Figure 1B:
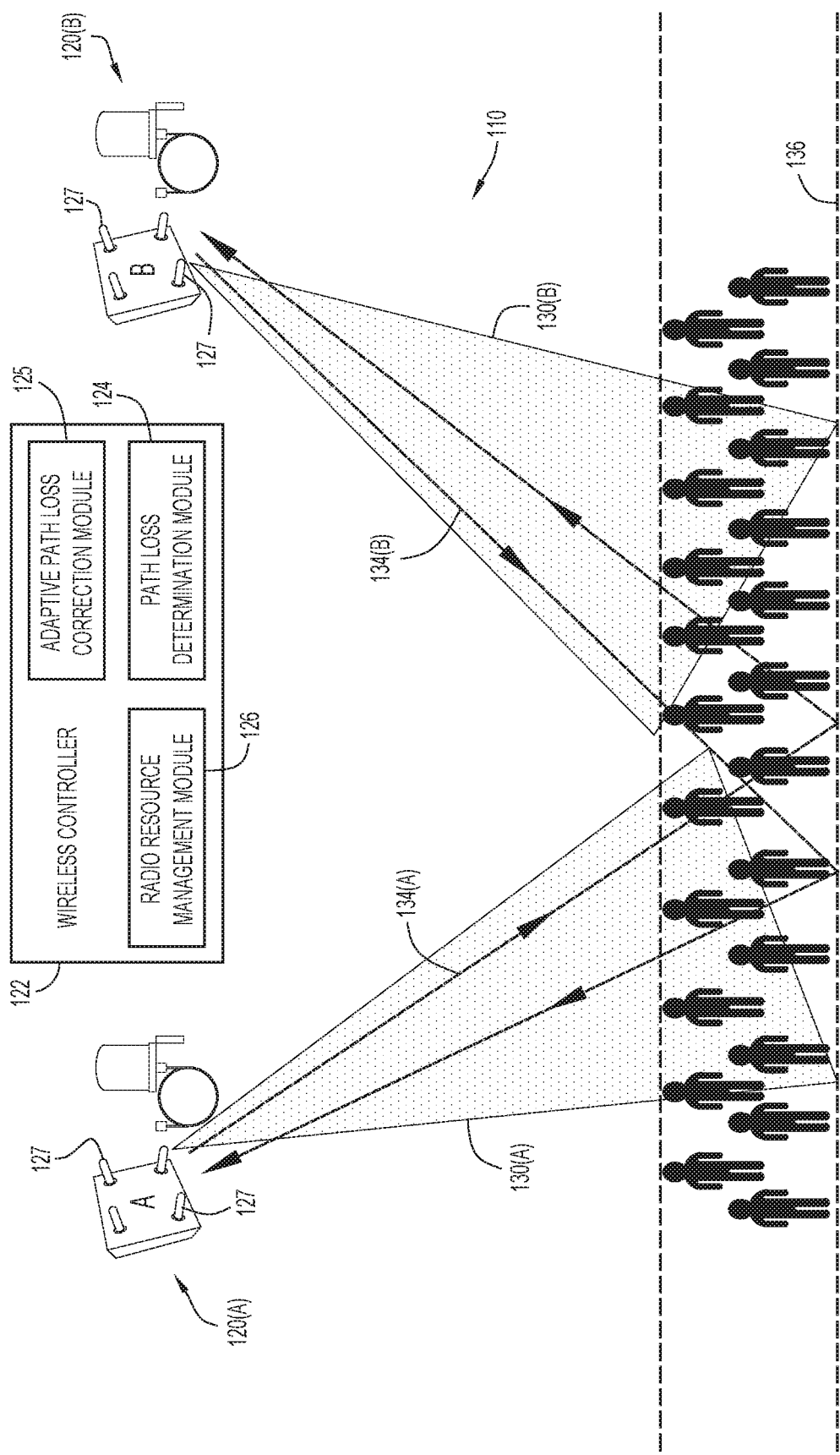

FIGS. 1A and 1B are schematic diagrams illustrating a simplified portion of a wireless network 110, in which the adaptive path loss correction techniques presented herein may be employed. The wireless network 110 may include a plurality of access points that provide wireless connectivity to various wireless electronic devices (wireless client devices or wireless clients) present in the vicinity of a location/site (e.g., office, stadium, etc.). For ease of illustration, only two access points 120(A) and 120(B) are shown in FIGS. 1A and 1B. Access point 120(A) is referred to herein as "access point A," while access point 120(B) is sometimes referred to herein as "access point B." Also merely for ease of illustration, the wireless network 110 is described as servicing a stadium. It is to be appreciated that embodiments presented herein may be used in other wireless networks that provide wireless connectivity to other types of sites/environments.

Also shown in FIGS. 1A and 1B is a wireless controller 122. The wireless controller 122 is a centralized device configured to manage the access points in wireless network 110. To this end, wireless controller 112 includes a path loss (RF proximity) determination module 124, an adaptive path loss correction module 125, and a Radio Resource Management module 126. Further details of the path loss determination module 124, the adaptive path loss correction module 125, and the Radio Resource Management module 126 are provided below. The wireless controller 122 is connected to the access points 120(A) and 120(B) via, for example, a local area (or wide area) wired network. For simplicity, an intervening wired network is not shown in FIGS. 1A and 1B.

In the example of FIGS. 1A and 1B, the access points 120(A) and 120(B) each comprise a plurality of directional antennas 127 capable of producing antenna beams. Shown in FIGS. 1A and 1B is an antenna beam 130(A) generated by one or more of the directional antennas 127 of access point 120(A), and an antenna beam 130(B) generated by one or more of the directional antennas 127 of access point 120(B).

FIG. 1A illustrates two arrows, namely arrow 132(A) from access point 120(A) to access point 120(B), and arrow 132(B) from access point 120(B) to access point 120(A). Arrow 132(A) represents the neighbor messages received at access point 120(B) from access point 120(A) (e.g., "Y" decibels (dB) with reference to one milliwatt (mW) (dBm), at a transmit power "A" (i.e., TxPower A)). Arrow 132(B) represents the neighbor messages received at access point 120(A) from access point 120(B) (e.g., "X" dBm, at a transmit power "B" (i.e., TxPower B)). In FIG. 1A, TxPower A is substantially equal to TxPower B, then X dBm is approximately equal to Y dBm.

FIG. 1B illustrates two arrows, namely arrow 134(A) from access point 120(A) to access point 120(B), and arrow 134(B) from access point 120(B) to access point 120(A). Arrow 134(A) represents the neighbor messages received at access point 120(B) from access point 120(A) (e.g., "Y*" dBm, at a transmit power "A" (i.e., TxPower A)). Arrow 132(B) represents the neighbor messages received at access point 120(A) from access point 120(B) (e.g., "X*" dBm, at a transmit power "B" (i.e., TxPower B)).

As shown by arrows 132(A)-132(B) and 134(A)-134(B), the neighbor messages sent between access points 120(A) and 120(B) are reflected to one another via a surface (e.g., floor) 136. However, FIGS. 1A and 1B generally illustrate the wireless network site (e.g., stadium) in two different situations/states. In particular, in FIG. 1A, the stadium is substantially empty/vacant, meaning there are minimal persons (bodies) on the surface 136. FIG. 1A illustrates the typical circumstances in which the Radio Resource Management module 126, and thus operation of the access points 120(A) and 120(B), are initially set/programmed.

However, in FIG. 1B, the stadium is at least partially occupied, meaning there are a number of persons (bodies) on the surface 136. In such circumstances, the presence of the bodies on surface 136 will absorb some portion of the neighbor messages (RF signals) 134(A) and 134(B) that are sent between neighboring access points 120(A) and 120(B), thereby causing variations in computed path loss using conventional techniques. That is, absorption of some portion of the neighbor messages 134(A) and 134(B) may result in weaker received signals at each of the access points 120(A) and 120(B), thereby resulting, in conventional arrangements, a determination that neighboring access points are farther apart then they actually are.

More specifically, the wireless controller 122 is configured to receive, from the access points 120(A) and 120(B), information/data associated with neighbor messages 132(A)-132(B) and neighbor messages 134(A)-134(B). This data may be the inter-AP measurements or data that may be used to generate the inter-AP measurements. The path loss determination module 124 is configured to use the received data to calculate a path loss between the access points 120(A) and 120(B). In accordance with embodiments presented herein, the adaptive path loss correction module 125 is configured to generate an adjusted path loss that accounts for the presence of persons (bodies) at the surface 136 (e.g., in FIG. 1B).

In particular, as described further below, the adaptive path loss correction module 125 is configured to generate one or more correlation bias factors (correlation coefficients) using one or more mobile client density variation trends and one or more neighbor message power variation trends determined for the wireless network location (e.g., the stadium or part of the stadium). The path loss determination module 124 determines the path loss between the access points 120(A) and 120(B) based on the one or more correlation bias factors and information/data associated with neighbor messages 132(A)-132(B) and neighbor messages 134(A)-134(B). The adjusted path loss may then be used by the Radio Resource Management module 126 to set/configure (e.g., adjust) operations (e.g., TCP, FRA, etc.) of the access points 120(A) and/or 120(B).

FIGS. 1A and 1B illustrate an example which the adaptive path loss correction techniques presented herein are implemented in connection with access points with directional antennas and no LOS with one another. It is to be appreciated that this example is merely illustrative and that the techniques presented herein may be implemented in connection with other deployments.

Figure 2:
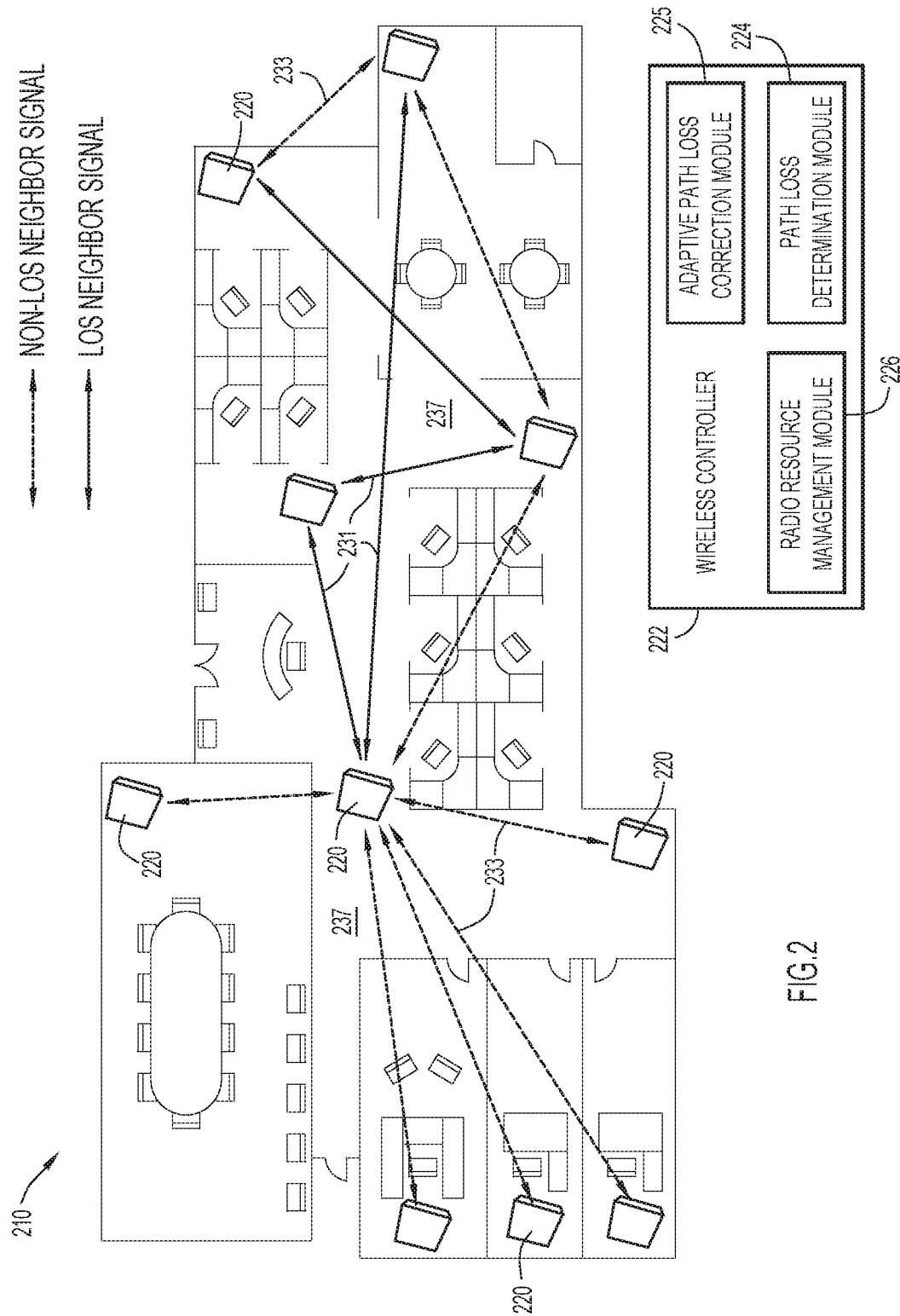
FIG. 2 is a schematic diagram illustration a portion of another wireless network configured to implement adaptive path loss correction techniques, in accordance with certain embodiments presented herein.

For example, FIG. 2 is a schematic illustrating a simplified portion of a wireless network 210, in which the adaptive path loss correction techniques presented herein may be employed. The wireless network 210 may include a plurality of access points 220 that provide wireless connectivity to various electronic devices (clients) present in the vicinity of a location/site (e.g., office building, school, etc.). Merely for ease of illustration, the wireless network 210 is described as servicing an office space/section 237 of an office building, sometimes referred to herein as office space 237. It is to be appreciated that embodiments presented herein may be used in other wireless networks that provide wireless connectivity to other types of sites/environments.

Also shown in FIG. 2 is a wireless controller 222. The wireless controller 222 is a centralized device configured to manage the access points 220 in wireless network 210. To this end, wireless controller 212 includes a path loss (RF proximity) determination module 224, an adaptive path loss correction module 225, and a Radio Resource Management module 226. Further details of the path loss determination module 224, the adaptive path loss correction module 225, and the Radio Resource Management module 226 are provided below. The wireless controller 222 is connected to the access points 220 via, for example, a local area (or wide area) wired network. For simplicity, the intervening wired network is not shown in FIG. 2.

In the example of FIG. 2, the access points 220 generally include omnidirectional antennas. However, due to the physical layout of the office building, neighboring access points may have different relationships with one another. For example, certain neighboring access points may be "LOS neighbors," meaning there is a direct LOS there between for exchanging neighbor messages. Other neighboring access points may be "Non-LOS neighbors," meaning there is no direct LOS there between for exchanging neighbor messages. In FIG. 2, an LOS neighbor relationship between two access points is shown by solid bi-directional arrows 231, while a Non-LOS relationship between two access points is shown by dashed bi-directional dashed arrows 233. As shown in FIG. 2, an access point may be both an LOS neighbor and a Non-LOS neighbor for different access points.

The office building of FIG. 2 may be used in different situations/states. In particular, at certain times, the office building is substantially empty/vacant, meaning there are minimal persons (bodies) present within the office space 237. This is the typical circumstances in which the Radio Resource Management module 226, and thus operation of the access points 220, are initially set/programmed. In contrast, in other circumstances, office space 237 may be occupied, meaning there are a significant number of persons (bodies) in the office space 237. In such circumstances, the presence of the bodies in the office space 237 will absorb some portion of the neighbor messages (RF signals) that are sent between neighboring access points 220, thereby causing variations in computed path loss. That is, absorption of some portion of the neighbor messages may result in weaker received signals at each of the access points 220, thereby resulting, in conventional arrangements, a determination that neighboring access points are farther apart then they actually are.

More specifically, the wireless controller 222 is configured to receive, from the access points 220, information/data associated with neighbor messages sent between various pairs of access points. This data may be the inter-AP measurements or data that may be used to generate the inter-AP measurements. The path loss determination module 224 is configured to use the received data to calculate a path loss (RF proximity) between neighboring access points. In accordance with embodiments presented herein, the adaptive path loss correction module 225 is configured to generate an adjusted path loss that accounts for the presence of persons (bodies) in the office space 237.

In particular, as described further below, the adaptive path loss correction module 225 is configured to generate one or more correlation bias factors (correlation coefficients) using one or more mobile client density variation trends and one or more neighbor message power variation trends determined for the wireless network location (e.g., the office space 237 or part of the office space 237). The path loss determination module 224 determines the path loss between neighboring access points based on the one or more correlation bias factors and information/data associated with neighbor messages. The adjusted path loss may then be used by the Radio Resource Management module 226 to set/configure (e.g., adjust) operations (e.g., TCP, FRA, etc.) of one or more of the access points 220.

Figure 3:
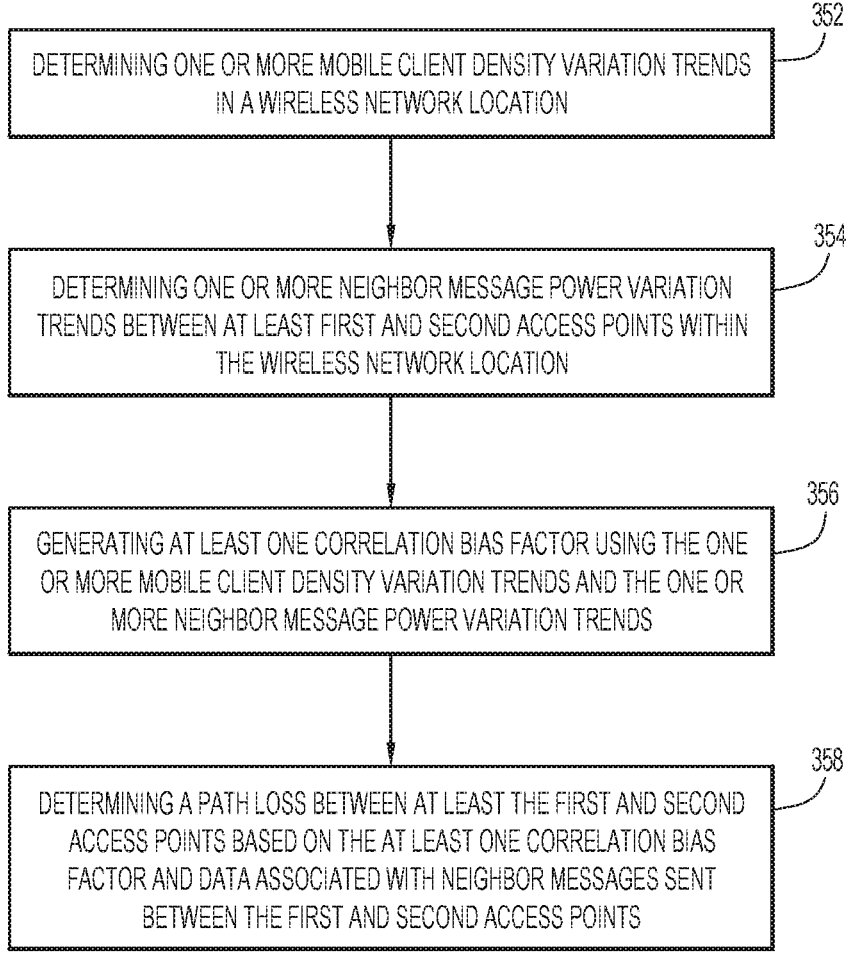
FIG. 3 is a flowchart of a method, in accordance with certain embodiments presented herein.

FIG. 3 is a flowchart of a method 350 in accordance with certain embodiments presented herein. For ease of description, method 350 will be generally described with reference to wireless network 210 of FIG. 2.

Method 350 begins at 352 where one or more "mobile client density variation trends" are determined for a wireless network location. As described further below, the wireless network location may be, for example, the physical space associated with an entire wireless network or a section/segment of the physical space associated with a wireless network. Further details regarding determination of mobile client density variation trends for a wireless network location are provided below with reference to FIG. 4.

At 354, method 350 includes determining one or more "neighbor message power variation trends" between at least first and second access points within the wireless network location. Further details regarding determination of neighbor message power variation trends between at least first and second access points are provided below with reference to FIGS. 5 and 6.

At 356, method 350 further includes generating at least one "correlation bias factor" based on the one or more mobile client density variation trends and the one or more neighbor message power variation trends. Further details regarding generation of correlation bias factors are provided below with reference to FIG. 7.

At 358, method 350 also includes determining a path loss between the at least the first and second access points based on the at least one correlation bias factor and data associated with neighbor messages sent between the first and second access points. Further details regarding determination of a path loss based on the correlation bias factor and data associated with neighbor messages are provided elsewhere herein.

As noted above, FIGS. 4, 5, 6, and 7 are graphs illustrating further details of the adaptive path loss correction techniques that may implemented, for example, in connection with FIGS. 1A, 1B, and 2. Merely for ease of illustration, FIGS. 4, 5, 6, and 7 are generally described with reference to wireless network 210 of FIG. 2. However, it is to be appreciated that the techniques presented herein may be implemented in other deployments.

As noted above, correlation bias factors are generated, in part, based on one or more mobile client density variation trends within a wireless network location, such as office space 237 or a section/segment of office space 237. As such, in accordance with examples presented herein, the adaptive path loss correction module 225 (or another entity) is configured to determine mobile client density variation trends within the office space 237.

Figure 4:
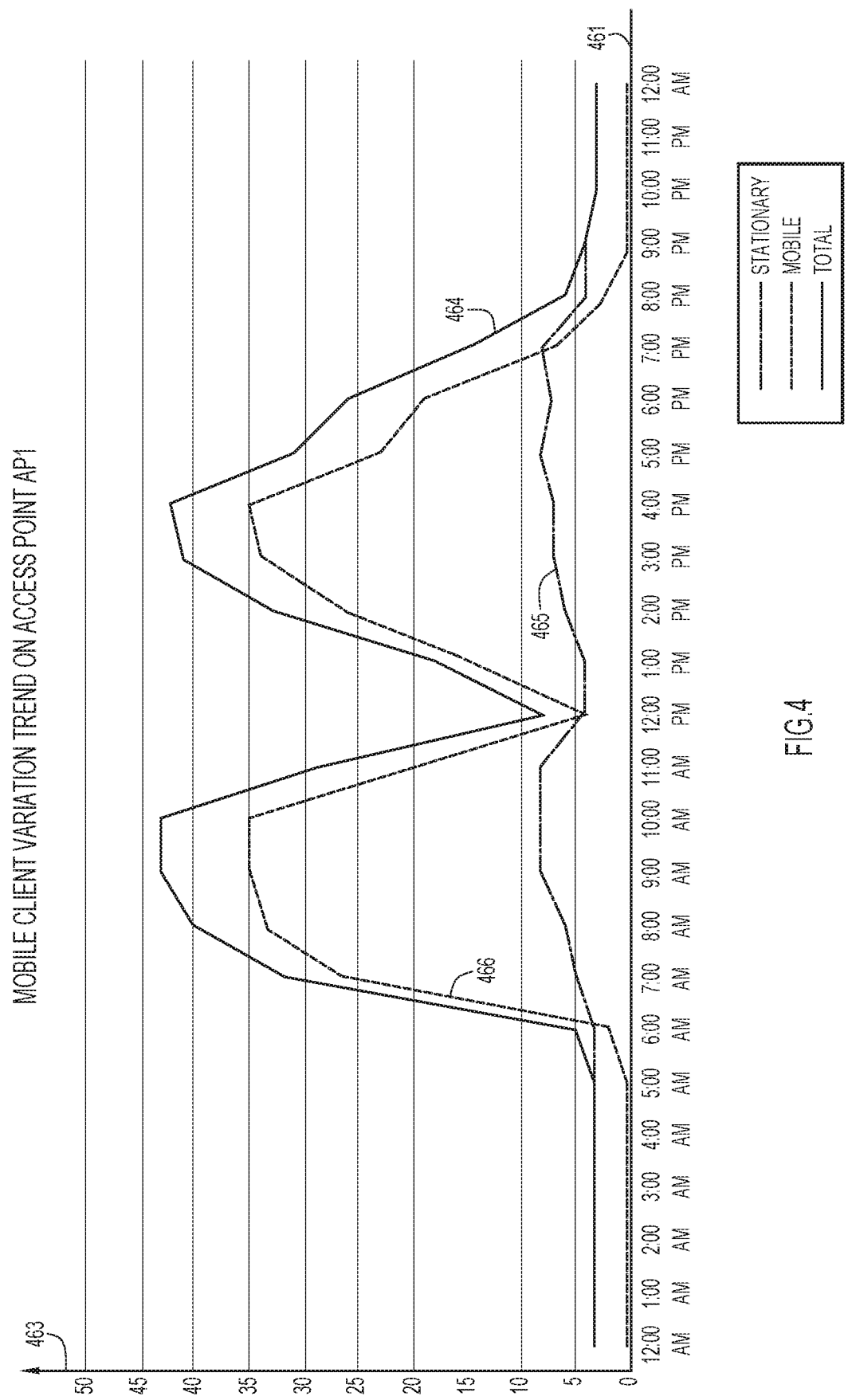
FIG. 4 is a graph illustrating example wireless client device density variation trends during a time period, in accordance with certain embodiments presented herein.

As used herein, the phrase "mobile client density variation trend" refers to fluctuations or changes in the presence of mobile wireless client devices (mobile clients) within an area of a wireless network location (e.g., a section of office space 237) over a time period. Referring specifically to FIG. 4, shown is a graph 460 having a first (horizontal) axis 461 and a second (vertical) axis 463. The horizontal axis 461 represents the hours in a twenty-four (24) hour time period, while the vertical axis 463 represents a number of wireless client devices (wireless clients).

FIG. 4 also includes three (3) curves/lines referred to as curves 464, 465, and 466. Curve 464 represents the total number of wireless client devices associated with a first access point (AP), identified as access point "A1," at different points in time during the illustrated 24 hour time period. The total number of wireless client devices 464 associated with access point A1 at any given point is determined based on the number of wireless client devices connected to (joined with) the access point A1. More specifically, when a wireless client device initially connects to an access point, the wireless client device sends an association request. This association request carries useful information that provides good visibility into the wireless client device (e.g., device type, vendor, operating system (OS), etc.). As such, using these association requests, the wireless controller 222 can determine which wireless client devices are connected to access point A1 at any given time.

The total number of wireless client devices 464 associated with access point A1 at any given point in time includes both "stationary" wireless client devices, represented by curve 465, and mobile wireless client devices, represented by curve 466. As used herein, the difference between a mobile wireless client device and a stationary wireless client device is based on predefined time windows. In particular, if a wireless client device stays connected to the access point AP1 throughout the entire (i.e., the duration of) predefined time window, then the wireless client device is labeled as a stationary wireless client device. However, if a wireless client device does not stay connected to the access point AP1 throughout the entire predefined time window, then the wireless client device is labeled as mobile wireless client device.

As noted, an association request carries useful information that provides good visibility into the wireless client device (e.g., device type, vendor, operating system (OS), etc.). In general, this information used for device classification to distinguish non-movable devices such as wireless printers, scanners, tagging devices, workstations, etc. from mobile devices such as smartphones, laptops, tablets, etc. These parameters will help create a database to ultimately deduce mobile clients from the overall client count. In certain examples, the determination of whether a device is a mobile wireless client device or a stationary wireless client devices is based on the client association duration. When a wireless client device is associated to the access points, it keeps sending periodic "heartbeat" message to keep the connection alive. When a wireless client device initiates roam, it sends a "death" message to the previously connected access point and sends another association to request to the next access point.

Therefore, analyzing association trends with active session information and RSSI variation, the wireless controller 222 (e.g., adaptive path loss correction module 225) can isolate stationary wireless client devices from mobile wireless client devices in the wireless network 210. This information may be useful, for example, for a few purposes. First, this information may be used by the wireless controller 222 to determine when to refresh benchmarks when, for example, a localized sector has a majority of the clients identified as stationary. Second, this information may be used to probe further into the mobile client devices in the network and corresponding resulting variances seen in path loss.

As noted, an identification of a wireless client device as stationary does not necessarily equate to a fixed position through the day, but instead is based on the predefined window. For example, wireless client devices (e.g., office printers, wireless projectors, sensors, etc.) present on an office floor would remain stationary indefinitely. However, other stationary wireless client devices (e.g., laptop computers, tablet computers, etc.) may not have a fixed position and/or may only be present in the office space 237 during certain hours of the day. Therefore, as shown by curve 465, the number of stationary wireless client devices may fluctuate throughout the day.

In general, the predefined time window used to determine whether a wireless client device is a mobile wireless client device or a stationary wireless client device can be variable. For example, in certain examples, the predefined time window can be adjusted based on changes in the density and mobility of individual RF environment. Different predefined time windows can be established throughout the day, where initial benchmarks can be refreshed As noted above, variations in path loss between neighboring access points is generally due to the fact that the bodies of these persons present in a wireless network site will absorb some portion of the neighbor messages sent between neighboring access points. As such, since these variations in path loss are primarily driven by moving objects on the floor, the techniques presented herein rely on the number of mobile wireless client devices 466 to determine the impact of the presence of persons (bodies) on path loss. As such, the number of stationary wireless client devices 465 can be subtracted from the total number of wireless client devices 464 to determine the number of mobile wireless client devices 466 (i.e., curve 466 reflects the difference between curve 464 and 465, at each corresponding point in time).

In the example of FIG. 4, a trend of increasing mobile wireless client device count can be seen as beginning around 6:00 AM in the morning, with a first peak occurring around 11:30 AM. A trough in mobile wireless client device count is observed around 12:00 PM, followed by a second peak around 4 PM. Therefore, the mobile wireless client device count decreases and falls to zero (0) around 9:00 PM. The example of FIG. 4 illustrates two aspects of the techniques presented herein. First, with a fixed window size (e.g., at 1800 sec), the example shows a gradual increase in stationary wireless client devices throughout the day. Second, the specific example of FIG. 4 illustrates an opportunity to enable different benchmark refresh periods (predefined time windows for identification of stationary clients) between 11:30 AM and 1 PM as the system load goes down significantly.

In general, the number of mobile wireless client devices 466 (mobile wireless client device count) can be used determine the mobile wireless client device density trend(s) for the office space 237, or a portion thereof. In practice, a wireless network, such as wireless network 210, may include multiple access points for which mobile wireless client device counts can be obtained. These mobile wireless client device counts from the multiple different access points can be used by wireless controller 222 to generate mobile client density variation trends for wireless network 210, or a segment of wireless network 210.

As noted above, adaptive path loss correction module 225 generates a correlation bias factor based, in part, on one or more neighbor message power variation trends between at least first and second access points within a wireless network location, such as office space 237 or a section/segment of office space 237. As such, in accordance with examples presented herein, the adaptive path loss correction module 225 (or another entity) is configured to determine neighbor message power variation trends for neighboring access points within the office space 237.

Figure 5:
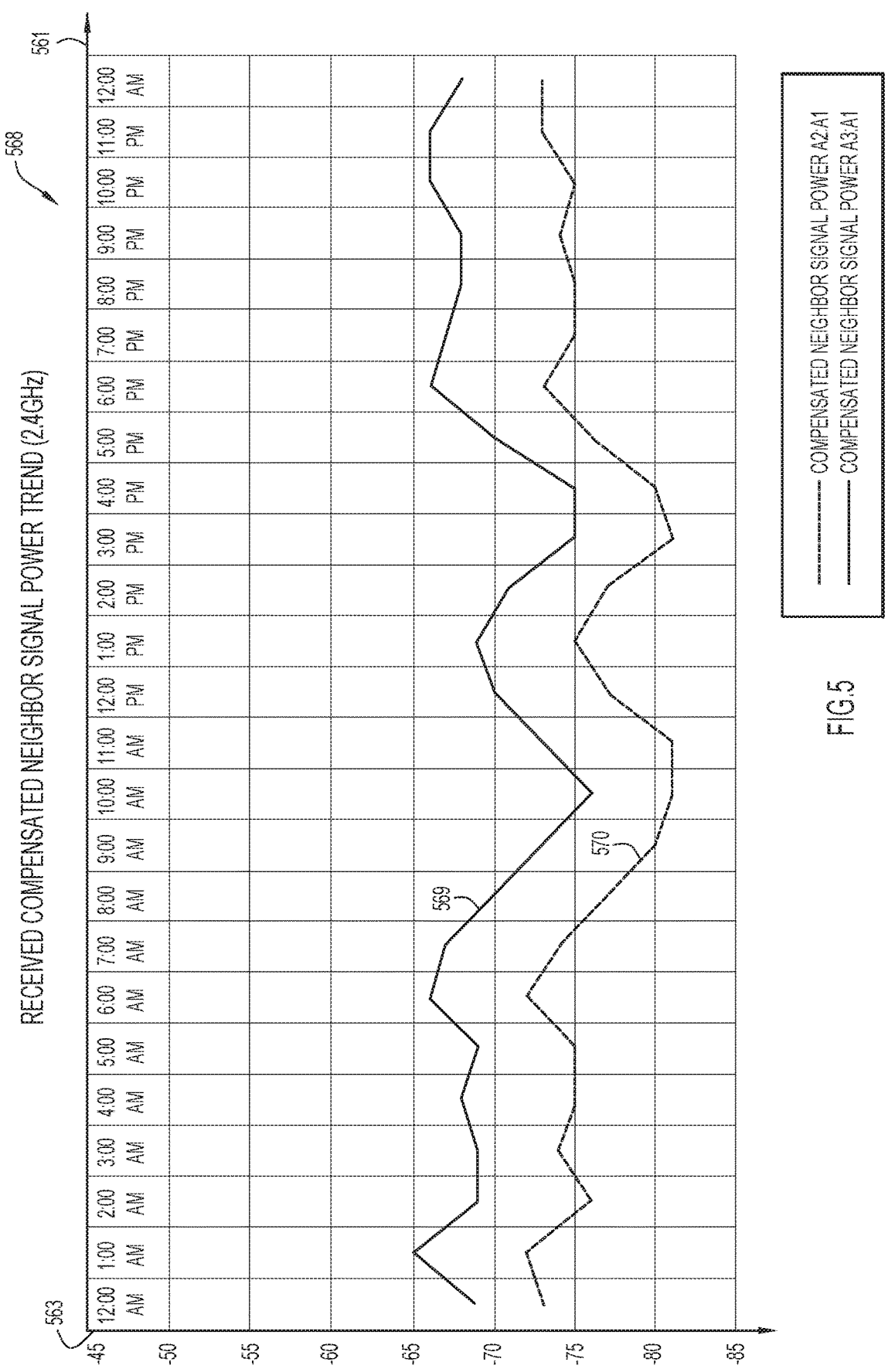
FIG. 5 is a graph illustrating neighbor message power variation trends for an access point during a period time and at a first frequency, in accordance with certain embodiments presented herein.

As used herein, the phrase "neighbor message power variation trend" refers to fluctuations or changes in the neighbor messages sent between neighboring access points within an area of a wireless network location (e.g., a section of office space 237) over a time period. In particular, referring specifically to FIG. 5 shown is a graph 568 having a first (horizontal) axis 561 and a second (vertical) axis 563. The horizontal axis 561 represents the hours in a twenty-four (24) hour time period, while the vertical axis 563 represents a compensated neighbor signal power in decibels (dB) with reference to one milliwatt (mW).

FIG. 5 also includes two (2) curves/lines referred to as curves 569 and 570. Curve 569 represents a first compensated neighbor signal power associated with neighbor signals received at access point A1, above, from a first neighboring access point, referred to as access point "A3," at different points in time during the same 24 hour time period of FIG. 4. In addition, curve 570 represents a second neighbor compensated signal power associated with neighbor messages received at access point A1, above, from a second neighboring access point, referred to as access point "A2," at different points in time during the illustrated 24 hour time period. FIG. 5 illustrates the compensated neighbor signal powers for neighbor messages received at access point A1 from each of access points A2 and A3 at a first frequency (e.g., 2.4 GHz).

Figure 6:
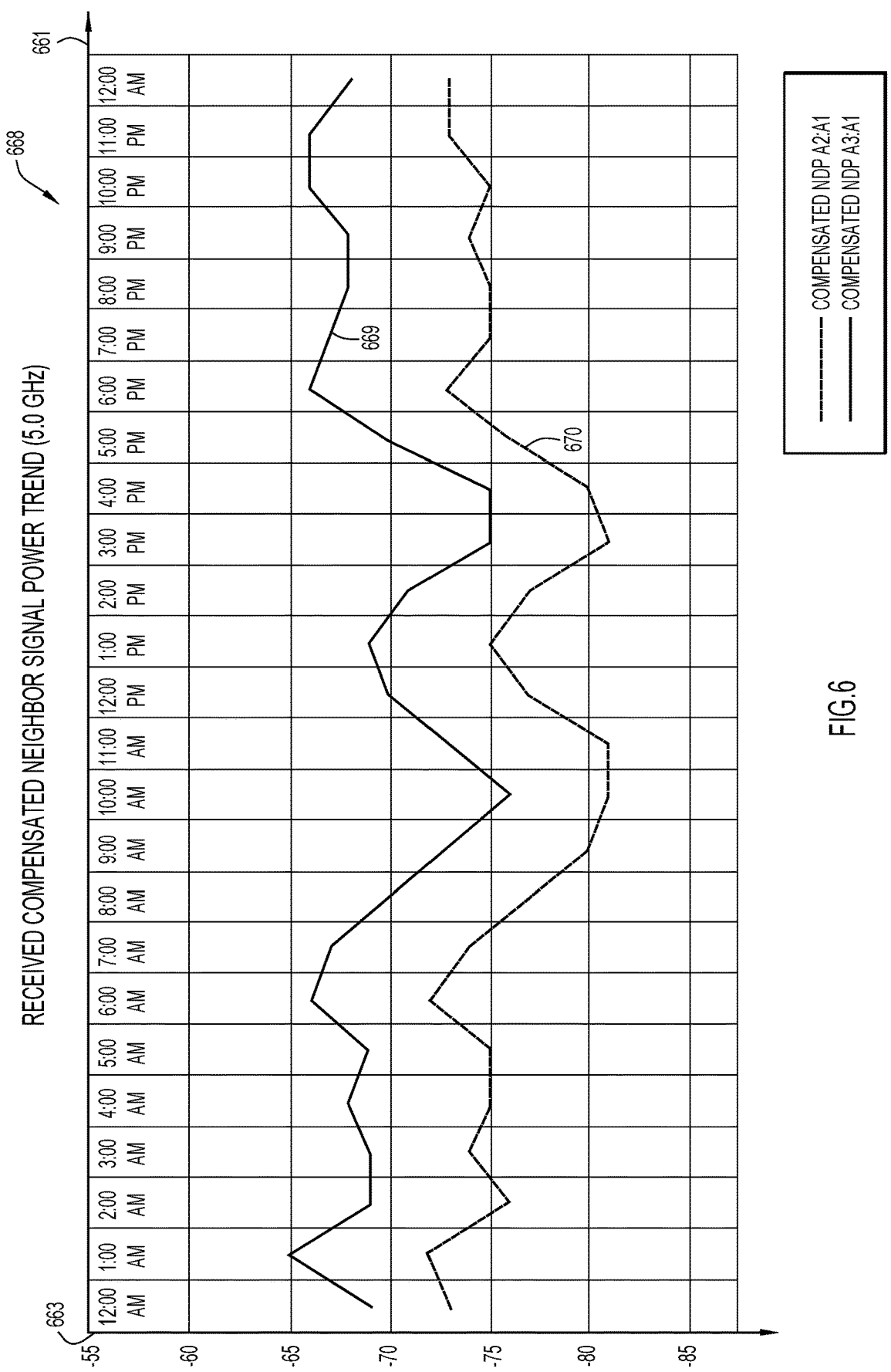
FIG. 6 is a graph illustrating neighbor message power variation trends for an access point during a period time and at a second frequency, in accordance with certain embodiments presented herein.

Referring next to FIG. 6 shown is a graph 668 having a first (horizontal) axis 661 and a second (vertical) axis 663. The horizontal axis 661 represents the hours in a twenty-four (24) hour time period, while the vertical axis 663 represents a compensated neighbor signal power in decibels (dB) with reference to one milliwatt (mW).

FIG. 6 also includes two (2) curves/lines referred to as curves 669 and 670. Curve 669 represents a first compensated neighbor signal power associated with neighbor signals received at access point A1, above, from the first neighboring access point A2 at different points in time during the same 24 hour time period of FIG. 4. In addition, curve 670 represents a second neighbor compensated signal power associated with neighbor messages received at access point A1, above, from the second neighboring access point A3 at different points in time during the illustrated 24 hour time period. FIG. 6 illustrates the compensated neighbor signal powers for neighbor messages received from each of access points A2 and A3 at a second frequency (e.g., 5 GHz).

Neighboring access points may be of different types, may use different transmit powers, and/or may have other variations. Therefore, to facilitate illustration, the power associated with the neighbor messages have, in FIGS. 5 and 6, been normalized/compensated based on the operational attributes of the transmitting and/or receiving access point. For example, if it is known what power was used to transmit a neighbor message, then this information can be used as part of a normalization process to generate the values shown in FIGS. 5 and 6. Therefore, as used herein, the term "compensated neighbor signal power" refers to the power of neighbor messages sent between access points that have been normalized/compensated to facilitate illustration.

Additionally, neighbor messages are susceptible to received signal variance due to the fact that transmit parameters can vary between neighboring endpoints (e.g., by the allowed power limited between diverse regulatory domains and power budget of the access points). In order to minimize false positives, the wireless controller 222, namely the adaptive path loss correction module 225, first learns the factors that can induce such variation and then applies methods to denoise this delta.

In operation, the wireless controller 222, namely the adaptive path loss correction module 225, will add complementary bias on power (e.g., RSSI) of neighbor messages received from a neighboring access point to minimize RSSI variance due to differences in operational attributes, such as Transmit Data Rate (CCK/OFDM), difference in total conducted power at which the neighbor message is transmitted, channel fading aberration due to Frequency Domain (Primary Frequency, UNI-Band Information, etc.) and Spectrum Identifier for a multi band radio's reception capabilities. These factors are used to calculate the compensated neighbor signal power on the neighbor messages. The adaptive path loss correction module 225 determines trends in the powers of received neighbor messages (e.g., based on the compensated neighbor signal powers at various endpoints), to generate the one or more neighbor message power variation trends for a wireless network location.

It is to be appreciated that, merely for ease of illustration, FIGS. 5 and 6 only illustrate the compensated neighbor signal powers for neighbor messages received from two neighboring access points. However, an access point may receive neighbor messages from a greater number of access points. As such, in practice, compensated neighbor signal powers may be determined for greater numbers of neighboring access points at any given access point. Additionally, compensated neighbor signal powers may be computed for many different combinations of neighboring access points within a wireless network (e.g., determine compensated neighbor signal powers at each of access points A1, A2, and A3 with respect to each of the other access points).

Figure 7:
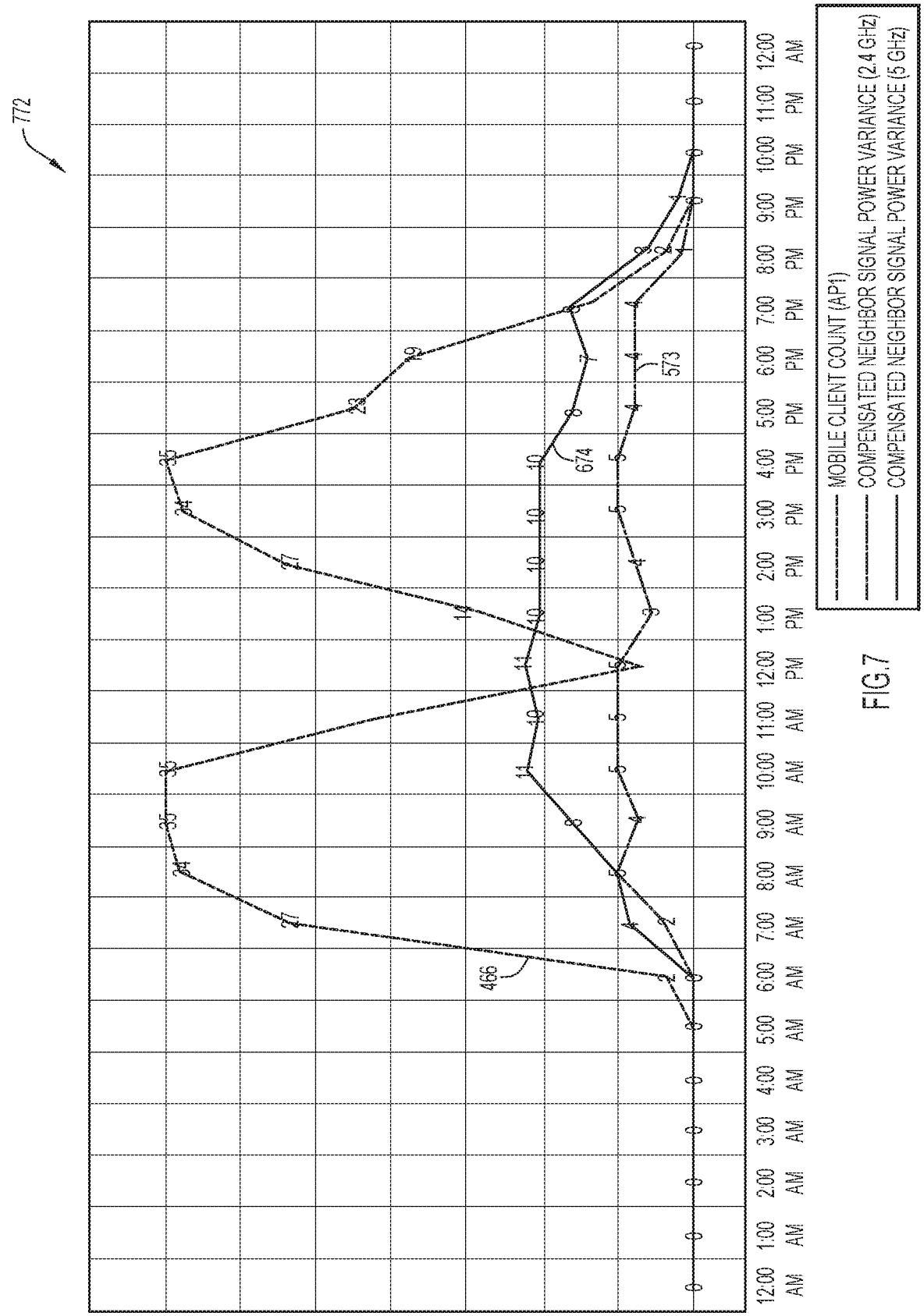
FIG. 7 is a graph illustrating a mobile client density trend with two neighbor message power variation trends during a period time, in accordance with certain embodiments presented herein.

Referring next to FIG. 7, shown is a graph 772 that includes three (3) curves. In particular, graph 772 includes curve 466 (FIG. 4) illustrating the number of mobile wireless client devices associated with access point A1, at each point in time during the 24 hour time period of FIGS. 4, 5, and 6. Additionally, FIG. 7 includes curve 573 and 674. Curve 573 is the variation, in dBM, between curves 569 and 570 of FIG. 5, while curve 674 is the variation, again in dBM, between curves 669 and 670 of FIG. 6. In other words, FIG. 7 illustrates the variation in compensated neighbor signal powers determined in FIGS. 5 and 6 (represented by curves 573 and 674, respectively), superimposed on the mobile wireless client device count 466 of FIG. 4.

FIG. 7 generally illustrates that, during the 24 hour time period, there is a strong correlation between mobile client/station density (bodies on the floor) and the variations in the power of the neighbor messages (AP-AP measurements). That is, as can be seen by curves 466, 573, and 674, the variances/fluctuations in the power of the neighbor messages generally correspond to times when access point A1 is relatively more loaded, meaning times when there are more mobile wireless client devices associated with access point A1 and, as such, there are more persons (bodies) in the area of access point A1.

This correlation between mobile wireless client device density and neighbor message power variations is what is leveraged in the techniques presented herein to determine/generate one or more correlation bias factors for access point A1 and, potentially, additional access points in the wireless network. That is, in accordance with embodiments presented herein, when the network is loaded (wireless client devices connected), the techniques presented herein determine the neighbor message power variations likely to seen by neighboring access points due to the presence of the bodies in the wireless network location. Once the variations are determined, these variations are converted, using the mobile wireless client device density, into a weighting or offset factor that can be applied to determine a path loss between neighboring access points. For example, in the example of FIGS. 4-7, a correlation bias factor of approximately 4.5 dBm in 2.4 GHz and approximately 11 dBm for 5 GHz for access point A1 may be generated. In operation, this correlation bias is then feedback into the path loss determination process (e.g., at path loss determination module 224) for calculation of an adjusted, and more correct, path loss associated with A1.

Stated differently, in accordance with the techniques presented herein, as data is gathered from various access points and in different RF sectors (i.e., different regions of a wireless network), the techniques presented herein identify correlations between mobile wireless client device density per RF Sector, Time-of-Day (ToD), and resulting variations seen in the power of neighbor messages (e.g., transmit and receive neighbor's RSSI) in the RF sectors. These correlations are then used to generate the one or more correlation bias factors for access points in the different RF sectors. For RF sectors with higher correlation bias factors, the techniques presented herein may further refine the bias factors by de-noising the data set and then applying rule based techniques such as an apriori algorithm, Association Rule Learning (ARL), etc. It is to be noted that, due to the use of Neighbor Discovery Smoothing algorithms on certain wireless local area network (WLAN) controllers, there is a gradual decrease in both 2.4 GHz and 5 GHz received neighbor signals at certain times.

As noted, FIGS. 4-7 generally illustrate the determination of one or more correlation bias factors for a first access point A1 in wireless network 210. In practice, one or more correlation bias factors may be generated for multiple access points in wireless network 210. Additionally as described further below, the operations described with reference to FIG. 3 and FIGS. 4-7 can be performed for the entire wireless network 210, or can be performed separately for different RF regions/areas of wireless network 210 (i.e., RF sectors). That is, one or more correlation bias factors can be independently generated for each of a number of different RF regions of the wireless network 210 so that these different regions may apply different corrections dictated by the one or more mobile client density variation trends and the one or more neighbor message power variation trends for that RF region. As such, as used herein, the term "wireless network location" can refer to the physical areas associated with an entire wireless network or the physical area associated within only a specific RF segment of a wireless network.

Figure 8:
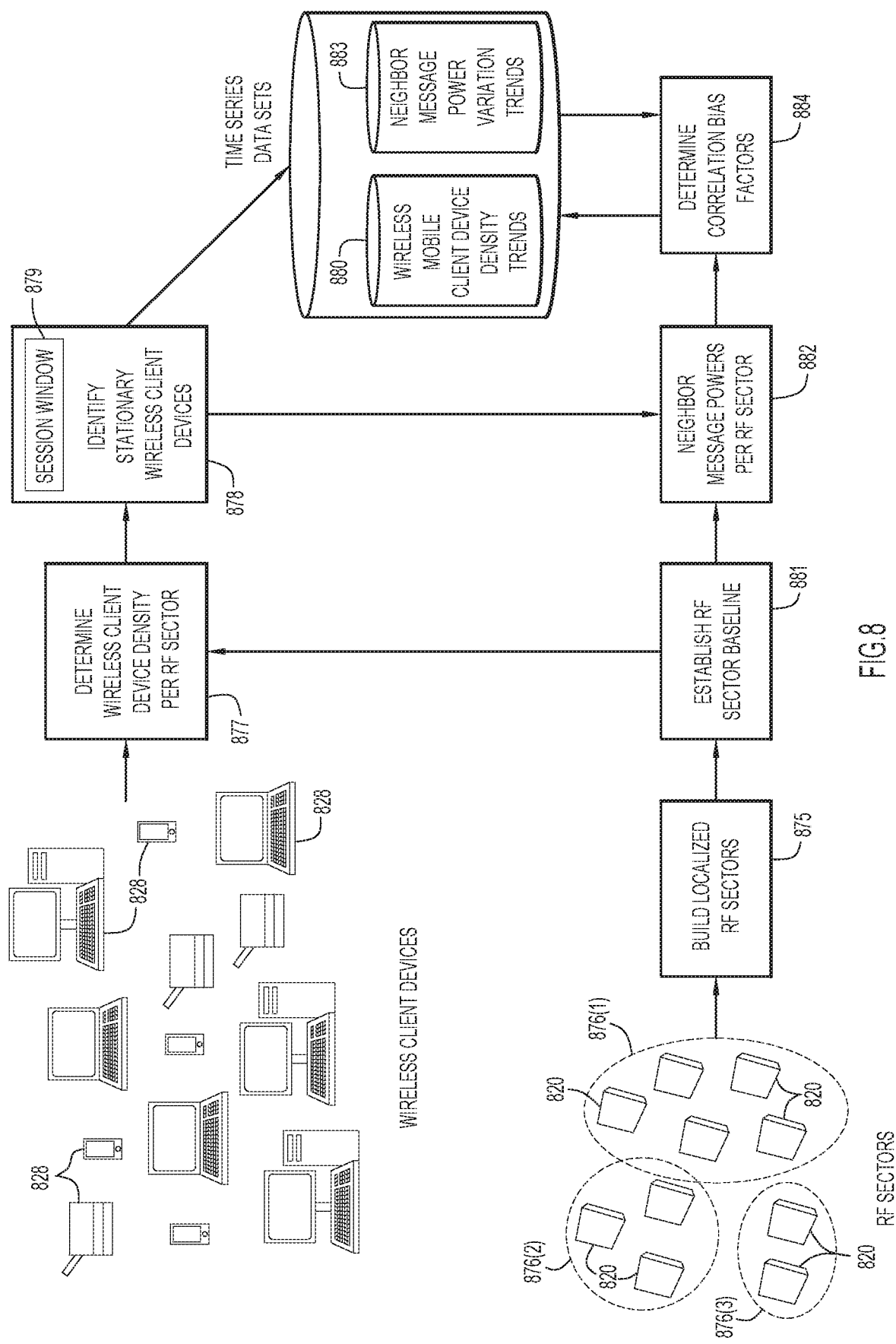
FIG. 8 is a flow diagram illustrating an example adaptive path loss correction technique, in accordance with certain embodiments presented herein.

FIG. 8 is a schematic flow diagram illustrating aspects of the techniques presented herein. First, FIG. 8 illustrates a plurality of access points 820 that are positioned within a wireless network location and collectively form at least part of a wireless network. Second, FIG. 8 illustrates a plurality of wireless client devices (wireless clients) 828 that may be positioned within the wireless network location and that generally connect to the wireless network formed by access points 820. The wireless client devices 828 may include devices that have a fixed position (e.g., printers, desktop computers, etc.) or devices (e.g., mobile phones, laptop computers, etc.) that can be physically moved within, or removed from, the wireless network location.

The flow of FIG. 8 begins at 875 where a wireless controller or other computing device (not shown in FIG. 8) organizes the access points 820 into localized RF sectors (i.e., groups of access points co-located within a physical area). FIG. 8 illustrates an example in which the access points 820 are organized into three different RF sectors, referred to as RF sectors 876(1), 876(2), and 876(3).

Next, at 877, the wireless controller uses the information regarding the RF sectors to determine a wireless client device density, per RF sector 876(1), 876(2), and 876(3) (e.g., as described above with reference to FIG. 4). At 878, the wireless client device density per RF sector 876(1),

876(2), and 876(3), along with a dynamically adjustable session window 879, is used to identify stationary wireless client devices (e.g., as described above with reference to FIG. 4). The result is the determination of the mobile wireless client device density trends 880, per RF sector 876(1), 876(2), and 876(3) (i.e., determine how the mobile wireless client device density changes/fluctuates over time).

Also shown in FIG. 8 is the establishment of a baseline for each RF sector 876(1), 876(2), and 876(3) at 881. In general, the baseline is a neighbor message (inter-Access Point neighbor signal) strength when the network is minimally loaded (e.g., low or no wireless clients connected). At 882, the powers of the neighbor messages sent between access points in each of the RF sectors 876(1), 876(2), and 876(3) are obtained at one or more frequencies. The neighbor message powers are used to determine neighbor message power signal variation trends 883, per RF sector 876(1), 876(2), and 876(3) (e.g., as described above with reference to FIGS. 5 and 6).

As noted above, the mobile wireless client device density trends 880 and the neighbor message power signal variation trends 883 are time series data sets representing fluctuations in client density and neighbor message power variations, respectively. At 884, the mobile wireless client device density trends 880 and the neighbor message power signal variation trends 883 are used to determine correlation bias factors for the access points 820.

In general the determined correlation bias factors may be different for different access points and/or for different RF sectors. For example, FIGS. 9A, 9B, and 9C are schematic diagrams illustrating varying correlation bias factors (correlation coefficients) for the different RF sectors 876(1), 876(2), and 876(3), each having different diverse wireless mobile wireless client device densities.

Figure 9A:
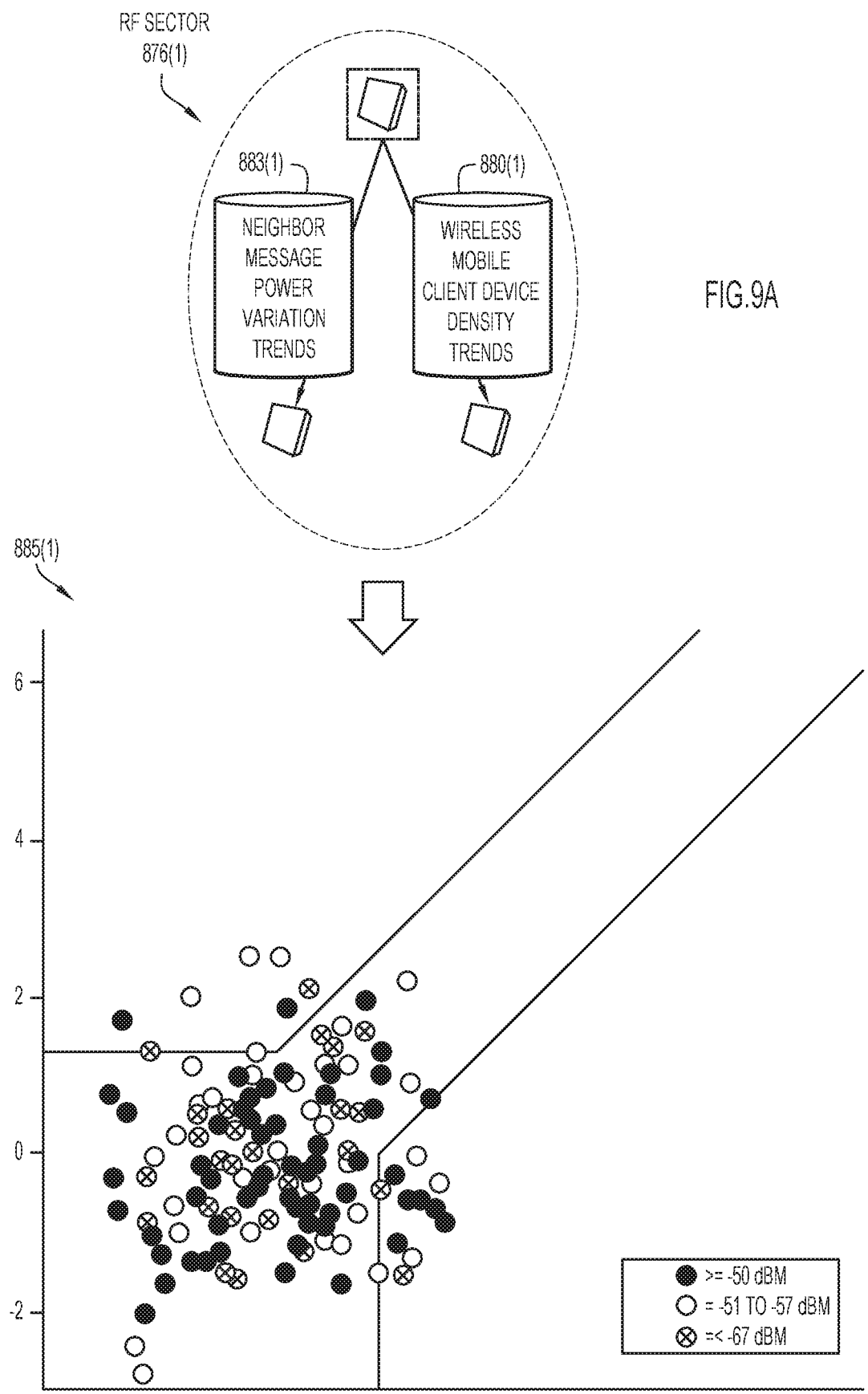
FIGS. 9A, 9B, and 9C are diagrams illustrating varying correlation bias factors for adaptive path loss correction, in accordance with certain embodiments presented herein.
Figure 9B:
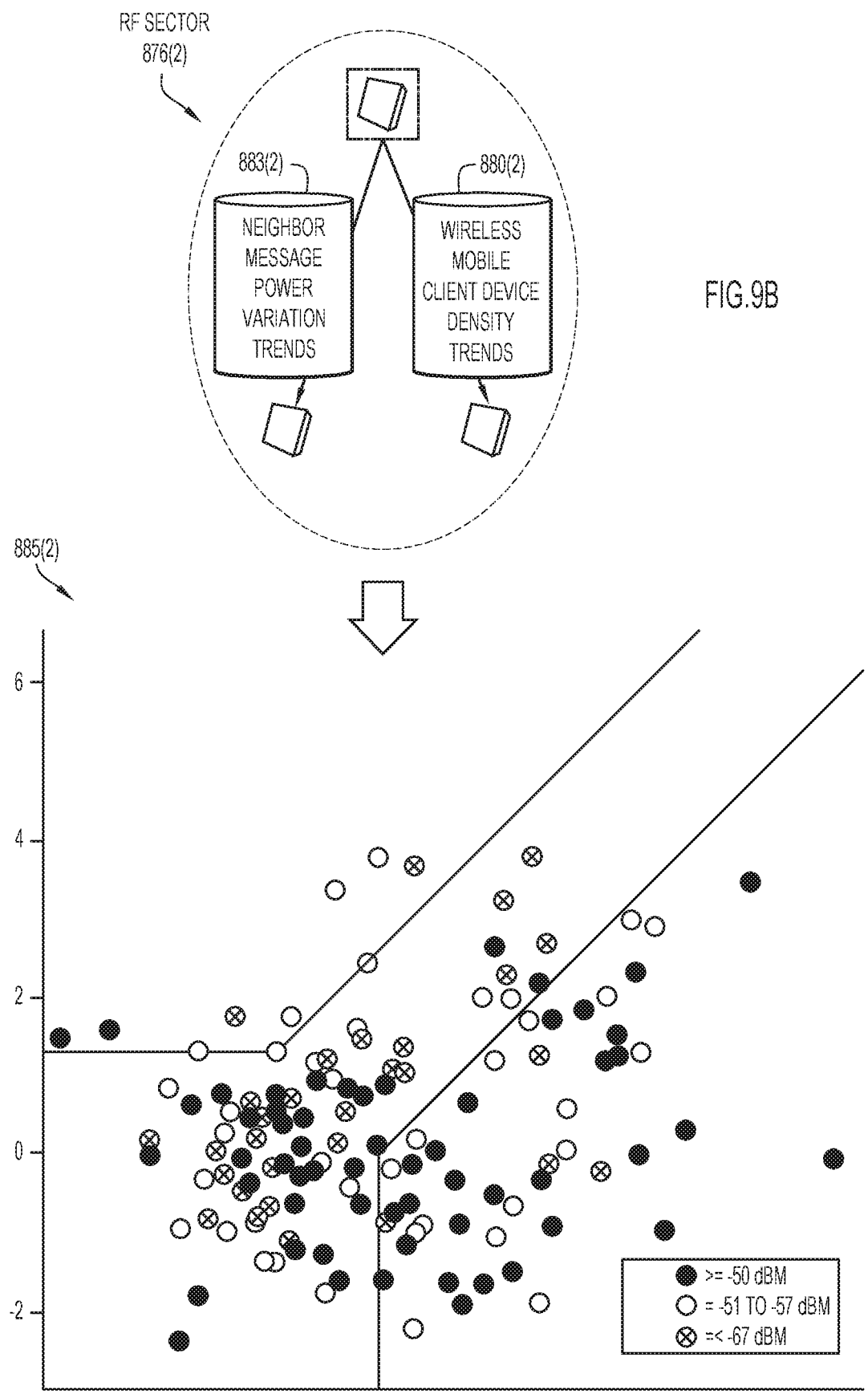
Figure 9C:
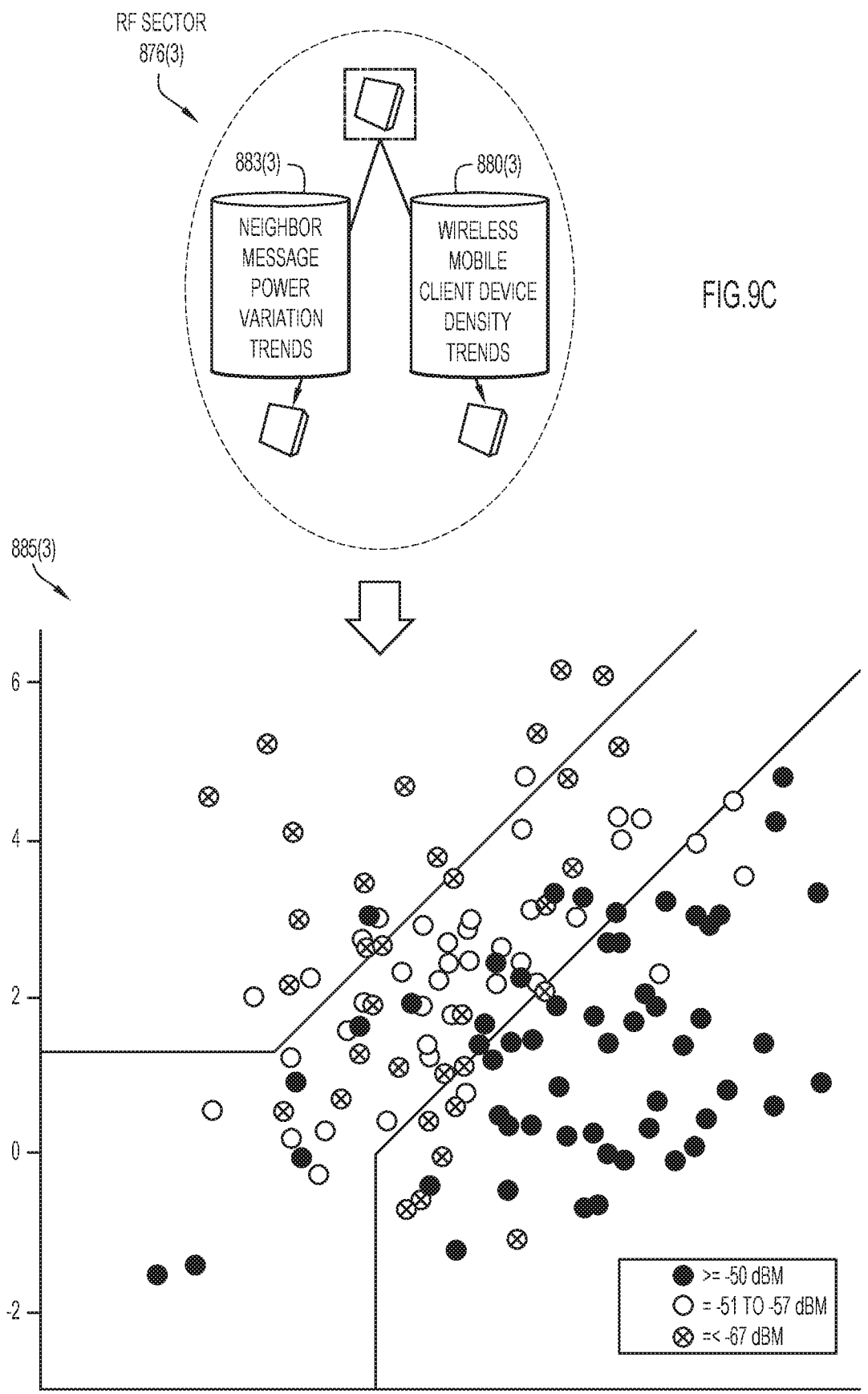

Shown in FIGS. 9A, 9B, and 9C are mobile wireless client device density trends 880(1), 880(2), and 880(3) determined for the RF sectors 876(1), 876(2), and 876(3), respectively. Also shown in FIGS. 9A, 9B, and 9C are neighbor message power signal variation trends 883(1), 883(2), and 883(3) determined for the RF sectors 876(1), 876(2), and 876(3), respectively. FIGS. 9A, 9B, and 9C also include graphs 885(1), 885(2), and 885(3), respectively illustrating the determined correlation bias factors determined for the RF sectors 876(1), 876(2), and 876(3), respectively. In FIGS. 9A-9C, the different patterned dots represent RSSI bucketization of wireless client devices from an access point (e.g., >=−50 dBm; =−51 to −67 dBm; =<−67 dBm). In general, a slight bias variation can be applied based on the client's count and distance from the access point.

As noted above, the techniques presented herein correlate received neighbor message power variation trends (e.g., received RSSI variation in the Neighbor Discovery frames) with mobile client density trends over a localized RF sector and time of the day. Additionally, in additional aspects, localized RF sectors with high correlation coefficients can adjust their power control thresholds to compensate for received RSSI degradations induced by the mobile client density.

In accordance with embodiments presented herein, the correlation bias factors determined for an access point, RF sector, or wireless network are used to determine path losses between neighboring access points. That is, in accordance with embodiments herein, a path loss between neighboring access points within a wireless network location can be determined using at least one correlation bias factor and data associated with neighbor messages sent between the neighboring access points. For example, a path loss between two neighboring access points in a wireless network location is determined using inter-AP radio frequency (RF) measurements (e.g., inter-AP Received Signal Strength Indication (RSSI) values) obtained from the real-time neighbor messages sent between the two neighboring access points. The at least one correlation bias factor may then be applied to the determined path loss to correct for the presence of persons (bodies) within the wireless network location. The result is a corrected/compensated path loss (e.g., a path loss that accounts for the presence of persons (bodies) within the wireless network location).

As noted above, the mobile client density within a wireless network location, and thus the number of moving bodies within the wireless network location, can vary throughout a time period. As such, the correlation bias factors in accordance with embodiments presented herein may be selectively applied, for example, only during certain time periods determined to correspond to time periods of sufficiently high mobile client density (e.g., time periods in which the mobile client density exceeds a determined threshold). In certain examples, these time periods may be predetermined time periods (e.g., set time windows). However, in other examples, these time periods may be dynamically determined based on a monitoring of the mobile client density. For example, in such embodiments, the mobile client density is monitored in real-time. Once the mobile client density exceeds a determined threshold, the correlation bias factors are instantiated for use in determination of path losses in the wireless network location.

In certain examples, the correlation bias factors determined for an access point, RF sector, or wireless network are static values that can be selectively applied in determination of a path loss. For example, a correlation bias factor of X dBm in 2.4 GHz and approximately Y dBm for 5 GHz could be determined for an RF sector and only applied during certain time periods (e.g., the time periods that correspond to sufficiently high mobile client density). In other examples, the correlation bias factors determined for an access point, RF sector, or wireless network are dynamic/variable values that can be determined or adjusted in real-time based on the real-time mobile client density variation trends and/or neighbor message power variation trends determined for the wireless network location.

An adjusted path loss determined in accordance with embodiments presented herein may be used in a number of different manners, such as for Radio Resource Management (RRM). For example, an adjusted path loss could be used to set/configure (e.g., adjust) the transmit power of access points within a wireless network location (e.g., for transmit power control (TPC)). In further examples, an adjusted path loss in accordance with embodiments presented herein could be used to configure dynamic channel assignment (DCA) for access points in a wireless network location. In general, DCA considers neighbor's signal strength in order to minimize frequency overlap between channels. The use of the adjusted path loss for DCA may void overestimation of neighbor message signals initially set while the wireless network location is substantially empty.

In certain examples, an adjusted path loss in accordance with embodiments presented herein could be used for Flexible Radio Assignment (FRA). In conventional arrangements, variation in received neighbor message power influences FRA to create more coverage holes when mobile client density is at a peak. Therefore, using the techniques presented herein, adjustments in received neighbor message signal can be compensated in the Coverage Overlap Factor (COF) computation. This will ensure that the COF calculations are done with correct path loss determined, as described above, rather than readings initially set while the wireless network location is substantially empty.

In other examples, an adjusted path loss in accordance with embodiments presented herein could be used for Coverage Hole Detection and Mitigation (CDM). Similar to inter-AP NDP exchanges, a non-LOS signal between a first wireless client device and the serving access point can significantly deteriorate based on the density of other wireless client devices around the first wireless client device. The techniques presented herein to compute the level of signal deterioration between an access point and the first wireless client device and compute estimated DL RSSI at the station, which then can be feedback to the CHDM algorithm so that the RRM reacts based on the "true" downlink quality (and not just on the access point view).

It is to be appreciated that the above uses of correlation bias factors and/or adjusted path losses are illustrative and that these values can be used in a number of different manners for control of a wireless network. In certain embodiments, conducted power for OTA transmissions can be artificially stamped to reflect increase in the additional path loss. For example, neighbor messages sent at the highest power in 2.4 GHz (e.g., at 23 dBm) can stamp conducted power as 17 dBm in high correlation bias factor sites with observed increase in path loss exceeding 6 dBm. As used herein, stamping generally refers to embedding new transmit power (e.g., NDP TxPower) based on the observed variation. For example, localized networks that observe consistent 6 dBm of degradation due to higher mobile density throughout the day, can have transmit power of −6 dB stamped as the artificial power stamped for the neighbor messages (NDP frames).

Moreover, path loss variations conducted at the RF sectors can provide feedback into the correlation estimates and models can predict how much additional path adjustment needs to be made at varying times of the day based on the previously observed client density and association trends. Basically, as the system is calculating path loss variation based on the mobile client device density across different RF sectors at a customer site, learnings from one site can be used in estimation of path loss degradation to another site with similar RF density and client device load.

Figure 10:
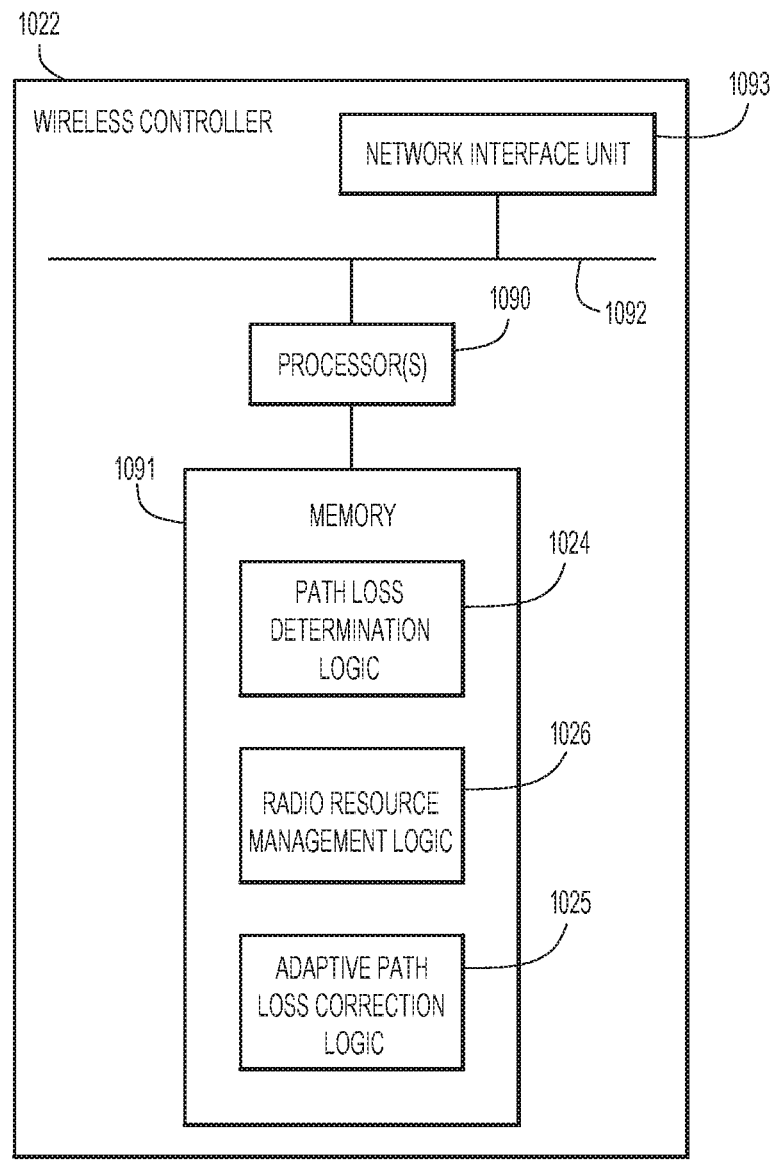
FIG. 10 is a block diagram of a wireless controller, in accordance with certain embodiments presented herein.

FIG. 10 is a block diagram of a wireless controller 1022 configured to perform the techniques presented herein. The wireless controller 1022 includes at least one processor 1090, memory 1091, a bus 1092 and a network interface unit 1093. The at least one processor 1090 may be a microprocessor or microcontroller. The network interface unit 1093 facilitates network communications between the wireless controller 1022 and network nodes (e.g., access points). The processor 1090 executes instructions associated with software stored in memory 1091. Specifically, the memory 1091 path loss determination logic 1024 that, when executed by the processor 1090, performs the operations of the path loss determination modules 124, 224 of FIGS. 1 and 2, respectively. The memory 1091 also stores adaptive path loss correction logic 1025 that, when executed by the processor 1090, performs the operations of the adaptive path loss correction modules 125, 225 of FIGS. 1 and 2, respectively. Finally, the memory 1091 stores Radio Resource Management logic 1026 that, when executed by the processor 1090, performs the Radio Resource Management operations of the Radio Resource Management modules 126, 226 of FIGS. 1 and 2, respectively (e.g., dynamic channel assignment operations, transmit power control operations, etc.).

The memory 1091 may comprise read only memory (ROM), random access memory (RAM), magnetic disk storage media devices, optical storage media devices, flash memory devices, electrical, optical, or other physical/tangible memory storage devices. In general, the memory 1091 may comprise one or more tangible (non-transitory) computer readable storage media (e.g., a memory device) encoded with software comprising computer executable instructions and when the software is executed (by the processor 1090) it is operable to perform the operations described herein.

It is to be appreciated that the specific arrangement of wireless controller 1022 shown in FIG. 10 is illustrative. It is also to be appreciated that the functions of the wireless controller 1022 may be virtualized, and for example, performed by an application running in a data center/cloud computing environment.

As noted above, presented herein are techniques for correlating mobile wireless client device density trends with neighbor message power variations (inter-access point received signal power variations) in a wireless network to determine correlation bias factors. The correlation bias factors are used to determine accurate/adjusted path losses between access points that compensate for the presence of persons (bodies) within the wireless network location and/or communicated between access points as part of the neighbor messages. As a result, operations of the access points can be controlled in an optimal manner.

In one aspect, a method is provided. The method comprises: determining one or more mobile client density variation trends in a wireless network location; determining one or more neighbor message power variation trends between at least first and second access points within the wireless network location; generating at least one correlation bias factor using the one or more mobile client density variation trends and the one or more neighbor message power variation trends; and determining a path loss between at least the first and second access points based on the correlation bias factor and data associated with neighbor messages sent between the first and second access points.

In another aspect, an apparatus is provided. The apparatus comprises: one or more network interface units; a memory; and at least one processor configured to: determine one or more mobile client density variation trends in a wireless network location; determine one or more neighbor message power variation trends between at least first and second access points within the wireless network location; generate at least one correlation bias factor using the one or more mobile client density variation trends and the one or more neighbor message power variation trends; and determine a path loss between at least the first and second access points based on the correlation bias factor and data associated with neighbor messages sent between the first and second access points.

In another aspect, one or more non-transitory computer readable storage media are provided. The non-transitory computer readable storage media are encoded with instructions that, when executed by a processor, cause the processor to: determine one or more mobile client density variation trends in a wireless network location; determine one or more neighbor message power variation trends between at least first and second access points within the wireless network location; generate at least one correlation bias factor using the one or more mobile client density variation trends and the one or more neighbor message power variation trends; and determine a path loss between at least the first and second access points based on the correlation bias factor and data associated with neighbor messages sent between the first and second access points.

The above description is intended by way of example only. Various modifications and structural changes may be made therein without departing from the scope of the concepts described herein and within the scope and range of equivalents of the claims.

What is claimed is:

1. A method comprising:
   determining one or more mobile client density variation trends in a wireless network location;
   determining one or more neighbor message power variation trends between at least first and second access points within the wireless network location;
   generating at least one correlation bias factor by analyzing the one or more mobile client density variation trends and the one or more neighbor message power variation trends with respect to time-of-day information to determine periods of time having fluctuations in neighbor message power and a predetermined mobile client density; and
   determining a path loss between at least the first and second access points based on the correlation bias factor and data associated with neighbor messages sent between the first and second access points.

2. The method of claim 1, further comprising:
   using the determined path loss to perform one or more Radio Resource Management operations for one or more of the first or second access points.

3. The method of claim 2, wherein using the determined path loss to perform one or more Radio Resource Management operations for one or more of the first or second access points comprises:
   configuring a transmit power of one or more of the first or second access points.

4. The method of claim 2, wherein using the determined path loss to perform one or more Radio Resource Management operations for one or more of the first or second access points comprises:
   performing one or more of dynamic channel assignment (DCA), Flexible Radio Assignment (FRA), or Coverage Hole Detection and Mitigation (CDM) for one or more of the first or second access points.

5. The method of claim 1, further comprising:
   stamping neighbor messages sent to one or more of the first and second access points with one or more of the at least one correlation bias factor or a modified transmit power selected based on the correlation bias factor.

6. The method of claim 1, wherein determining neighbor message power variation trends between at least the first and second access points includes:
   monitoring, over a time period, receive signal strength information associated with neighbor messages sent to one or more of the first and second access points from neighboring access points in the wireless network location.

7. The method of claim 1, wherein determining one or more mobile client density variation trends in a wireless network location includes:
   monitoring, over a time period, a total number of wireless client devices connected to each of the first and second access points at different points in the time period;
   monitoring, over the time period, a number of stationary wireless client devices connected to each of the first and second access points at different points in the time period; and
   using the total number of wireless client devices and the number of stationary wireless client devices connected to each of the first and second access points to identify a number of mobile client devices connected to each of the first and second access points at different points in the time period.

8. The method of claim 7, wherein monitoring, over the time period, the number of stationary wireless client devices connected to each of the first and second access points at different points in the time period comprises:
   determining which of the total number of wireless client devices have been connected to one or more of the first or second access points for a duration of a predefined time window.

9. An apparatus, comprising:
   one or more network interface units;
   a memory; and
   at least one processor communicatively coupled to the one or more network interface units and the memory, the at least one processor configured to:
      determine one or more mobile client density variation trends in a wireless network location;
      determine one or more neighbor message power variation trends between at least first and second access points within the wireless network location;
      generate at least one correlation bias factor by analyzing the one or more mobile client density variation trends and the one or more neighbor message power variation trends with respect to time-of-day information to determine periods of time having fluctuations in neighbor message power and a predetermined mobile client density; and
      determine a path loss between at least the first and second access points based on the correlation bias factor and data associated with neighbor messages sent between the first and second access points.

10. The apparatus of claim 9, wherein the at least one processor is further configured to:
    use the determined path loss to perform one or more Radio Resource Management operations for one or more of the first or second access points.

11. The apparatus of claim 10, wherein to use the determined path loss to perform one or more Radio Resource Management operations for one or more of the first or second access points, the at least one processor is configured to:
    configure a transmit power of one or more of the first or second access points.

12. The apparatus of claim 10, wherein to use the determined path loss to perform one or more Radio Resource Management operations for one or more of the first or second access points, the at least one processor is configured to:
    perform one or more of dynamic channel assignment (DCA), Flexible Radio Assignment (FRA), or Coverage Hole Detection and Mitigation (CDM) for one or more of the first or second access points.

13. The apparatus of claim 9, wherein the at least one processor is configured to:
    stamp neighbor messages sent to one or more of the first and second access points with one or more of the at least one correlation bias factor or a modified transmit power selected based on the correlation bias factor.

14. The apparatus of claim 9, wherein to determine neighbor message power variation trends between at least the first and second access points, the at least one processor is configured to:

monitor, over a time period, receive signal strength information associated with neighbor messages sent to one or more of the first and second access points from neighboring access points in the wireless network location.

15. The apparatus of claim 9, wherein to determine one or more mobile client density variation trends in a wireless network location, the at least one processor is configured to:
monitor, over a time period, a total number of wireless client devices connected to each of the first and second access points at different points in the time period;
monitor, over the time period, a number of stationary wireless client devices connected to each of the first and second access points at different points in the time period; and
use the total number of wireless client devices and the number of stationary wireless client devices connected to each of the first and second access points to identify a number of mobile client devices connected to each of the first and second access points at different points in the time period.

16. The apparatus of claim 15, wherein to monitor, over the time period, the number of stationary wireless client devices connected to each of the first and second access points at different points in the time period, the at least one processor is configured to:
determine which of the total number of wireless client devices have been connected to one or more of the first or second access points for a duration of a predefined time window.

17. One or more non-transitory computer readable storage media encoded with instructions that, when executed by a processor, cause the processor to:
determine one or more mobile client density variation trends in a wireless network location;
determine one or more neighbor message power variation trends between at least first and second access points within the wireless network location;
generate at least one correlation bias factor by analyzing the one or more mobile client density variation trends and the one or more neighbor message power variation trends with respect to time-of-day information to determine periods of time having fluctuations in neighbor message power and a predetermined mobile client density; and
determine a path loss between at least the first and second access points based on the correlation bias factor and data associated with neighbor messages sent between the first and second access points.

18. The non-transitory computer readable storage media of claim 17, further comprising instructions operable to:
use the determined path loss to perform one or more Radio Resource Management operations for one or more of the first or second access points.

19. The non-transitory computer readable storage media of claim 17, further comprising instructions operable to:
use the determined path loss to perform one or more Radio Resource Management operations for one or more of the first or second access points.

20. The non-transitory computer readable storage media of claim 17, further comprising instructions operable to:
stamp neighbor messages sent to one or more of the first and second access points with one or more of the at least one correlation bias factor or a modified transmit power selected based on the correlation bias factor.

* * * * *